(12) United States Patent
Shanahan

(10) Patent No.: US 6,592,139 B1
(45) Date of Patent: Jul. 15, 2003

(54) TRAILER WITH SELECTIVE ELEVATING AND LOWERING FEATURE

(76) Inventor: Robert Shanahan, 15034 Shoreline Dr., Weed, CA (US) 96094

( * ) Notice: Subject to any disclaimer, the term of this patent is extended or adjusted under 35 U.S.C. 154(b) by 51 days.

(21) Appl. No.: 10/040,152

(22) Filed: Jan. 2, 2002

(51) Int. Cl.⁷ .............................. B60D 1/06; B60P 1/00
(52) U.S. Cl. ............................. 280/414.5; 280/491.2; 280/511; 414/485
(58) Field of Search ........................ 280/414.5, 425.01, 280/490.1, 491.2, 511, 512, 6.15, 6.151, 656, 43, 46, 43.17; 414/481–483, 485

(56) References Cited

U.S. PATENT DOCUMENTS

| | | | |
|---|---|---|---|
| D149,806 S | 6/1948 | Gaboury | |
| 2,780,475 A | * 2/1957 | Koerner | 280/414.5 |
| 3,185,330 A | 5/1965 | Buckner | |
| 3,620,397 A | 11/1971 | Gagnon | |
| 3,701,445 A | 10/1972 | Haslem | |
| 3,837,665 A | 9/1974 | Schramm | |
| 4,077,643 A | 3/1978 | Bates | |
| 4,494,797 A | 1/1985 | Carberry | |
| 5,161,814 A | * 11/1992 | Walker | 280/414.5 |
| 5,975,828 A | 11/1999 | Weldy | |
| 6,474,672 B1 | * 11/2002 | Briscese | 280/414.5 |

* cited by examiner

*Primary Examiner*—Lesley D. Morris
*Assistant Examiner*—Matt Luby
(74) *Attorney, Agent, or Firm*—Thomas R. Lampe

(57) ABSTRACT

A wheeled transport vehicle includes a frame with two slidably interconnected frame members. A tongue projects from one of the members and is operable to move one of the frame members between extended and retracted positions. Wheel mounting members are pivotally connected to the frame. Mechanical linkage interconnecting the wheel mounting members and the tongue result in raising or lowering of the trailer frame. Stabilizers and locks are utilized to maintain trailer stability.

15 Claims, 6 Drawing Sheets

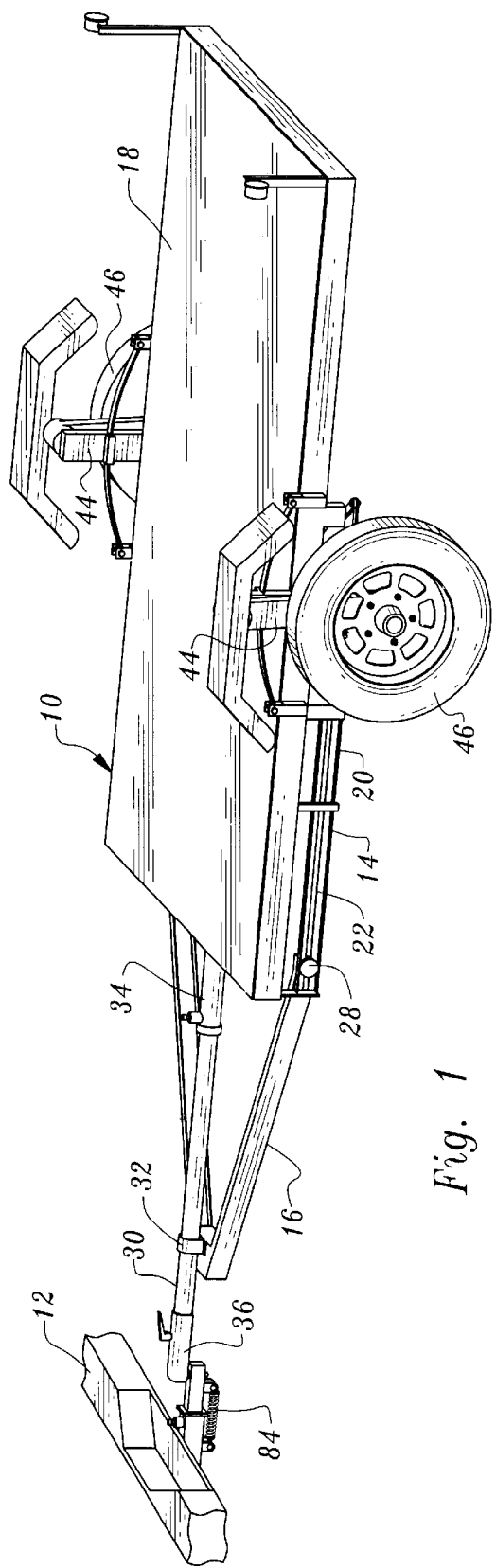
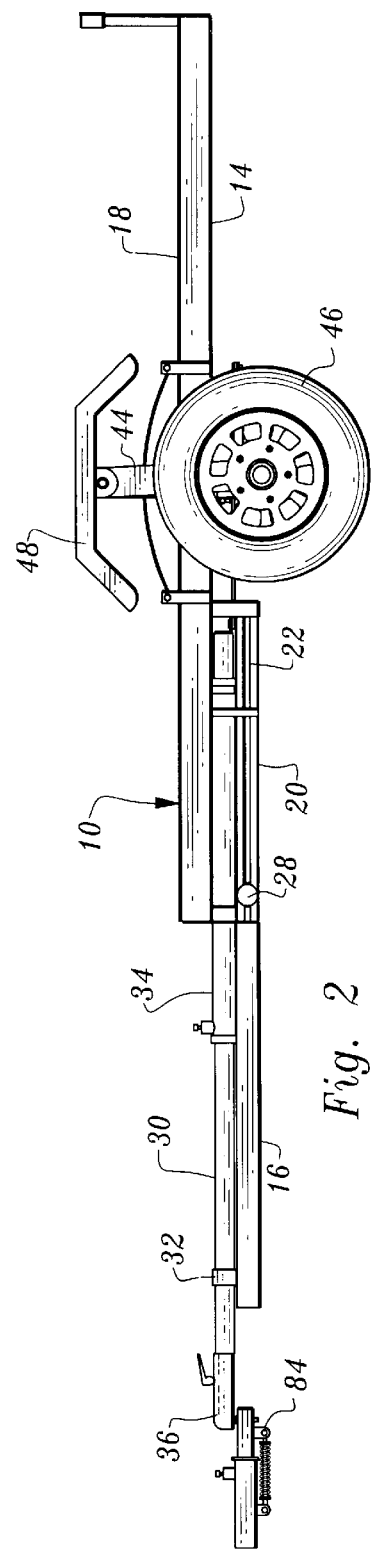
Fig. 1
Fig. 2

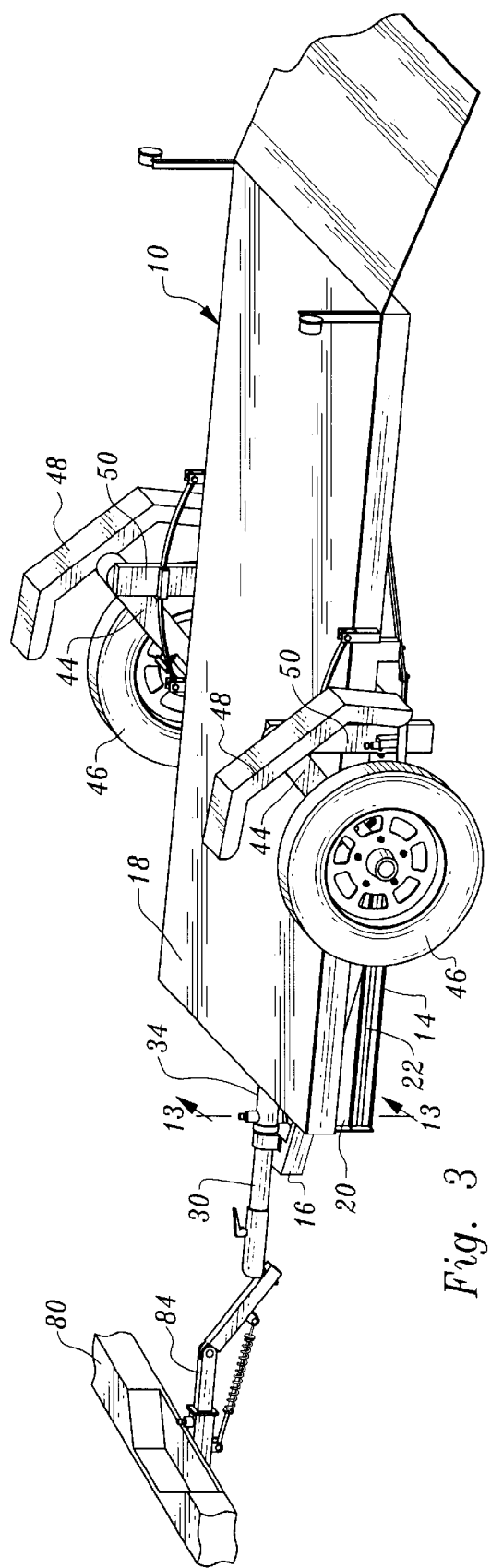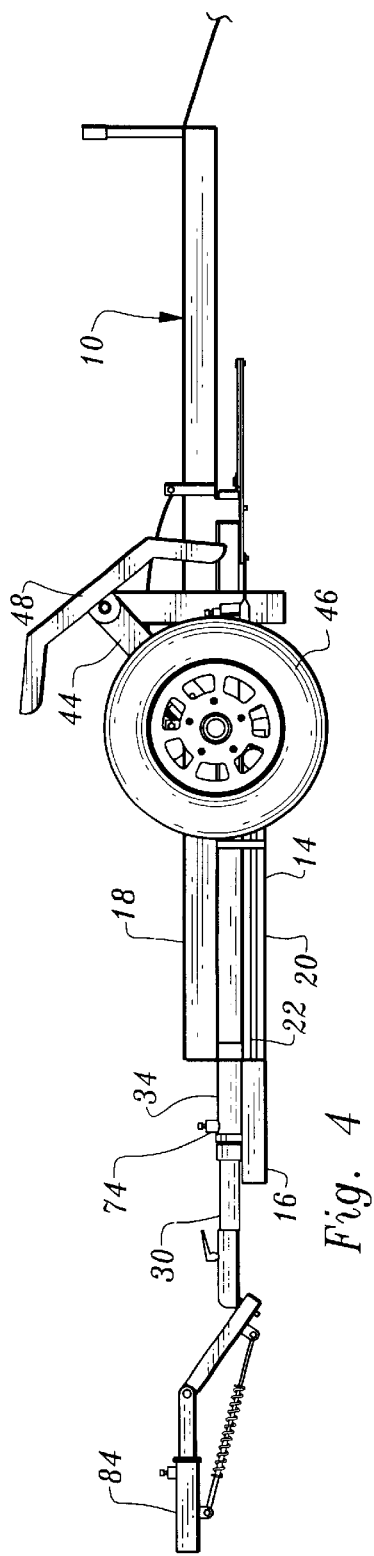
Fig. 3
Fig. 4

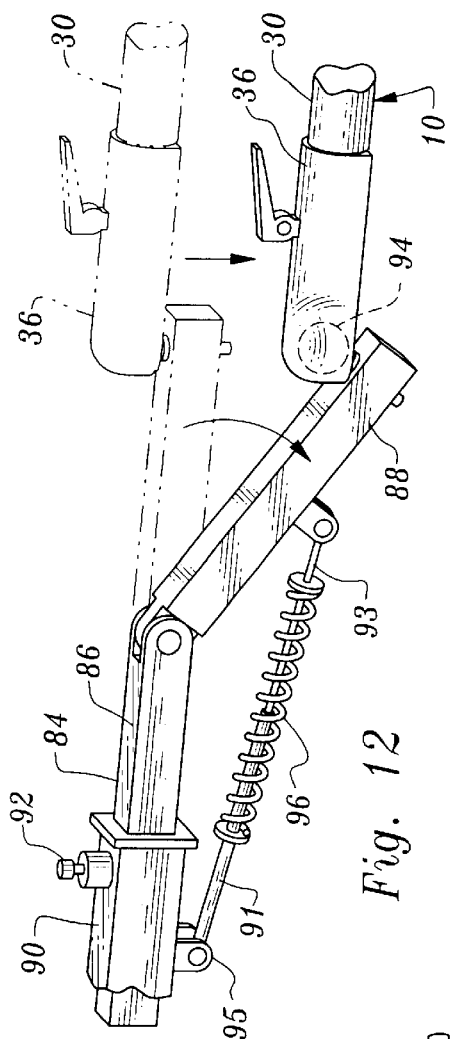
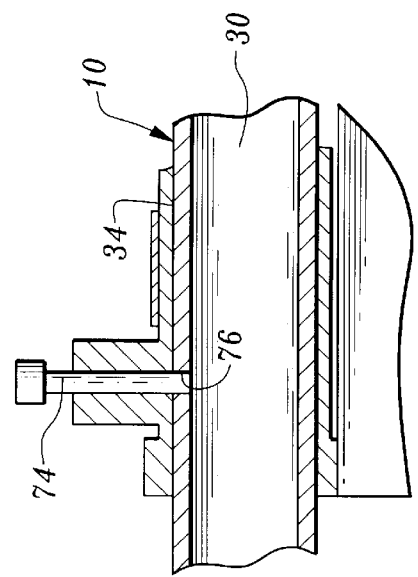
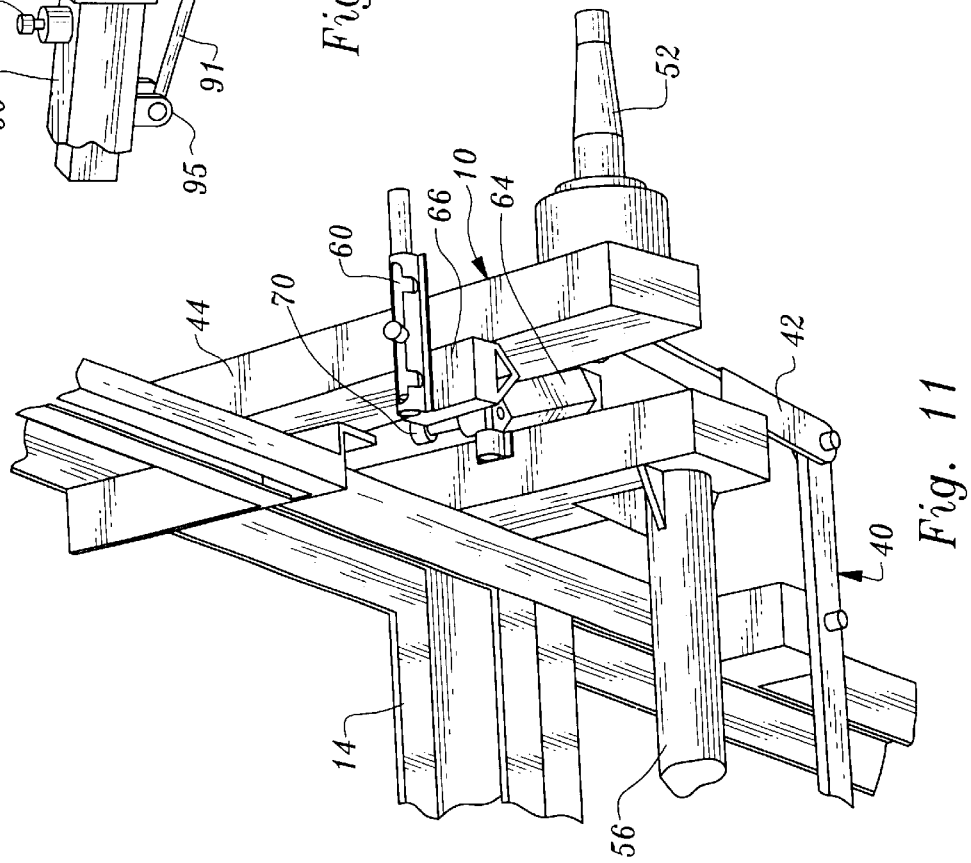
Fig. 11
Fig. 12
Fig. 13

TRAILER WITH SELECTIVE ELEVATING AND LOWERING FEATURE

TECHNICAL FIELD

This invention relates to a wheeled transport vehicle. The invention has particular application to trailers and incorporates structure which provides for the selective lowering or raising of the trailer frame.

BACKGROUND OF THE INVENTION

It is known to incorporate in a trailer mechanism that will allow for the selective elevation or lowering of the trailer frame.

U.S. Pat. No. 3,837,665, issued Sep. 24, 1974, discloses an elevatable trailer having a tongue adapted to be coupled to a towing vehicle. A frame is provided with a tongue guide in which the tongue is movable forwardly and backwardly. Bell crank arms carrying wheels are pivoted on the frame of the trailer and linkage pivots the bell crank arms and elevates the frame when the tongue is pulled forward. Latch means is provided for latching the tongue in forward position relative to the frame for maintaining the frame in elevated position relative to the ground and on the wheels carried by the bell crank arms.

U.S. Pat. No. 5,975,828 discloses a suspension system for wheeled vehicles which allows the body or frame of a vehicle, such as the trailer, to be lowered or tilted. The suspension system includes an off-set axle which, when rotated, adjusts the clearance beneath the wheeled vehicle so that the body or frame thereof can be lowered or tilted. The off-set axle includes a central portion which can be rotated by applying tension to a tensioning member attached thereto.

The following patents also illustrate apparatus having a degree of relevance to the present invention: U.S. Pat. No. DES. 149,806, issued Jun. 1, 1948, U.S. Pat. No. 4,077,643, issued Mar. 7, 1978, U.S. Pat. No. 3,701,445, issued Oct. 31, 1972, U.S. Pat. No. 3,185,330, issued May 25, 1965, U.S. Pat. No. 3,620,397, issued Nov. 16, 1971, U.S. Pat. No. 4,494,797, issued Jan. 22, 1985, U.S. Pat. No. 3,837,665, issued Sep. 24, 1974, and U.S. Pat. No. 5,975,828, issued Nov. 2, 1999.

DISCLOSURE OF INVENTION

As will be seen below, the wheeled vehicle disclosed and claimed herein incorporates a number of unique features which contribute to the utility of the wheel transport vehicle. More particularly, the wheel transport vehicle constructed in accordance with the teachings of the present invention is characterized by its stability, strength and ease of use as compared with prior art constructions.

The present invention relates to a wheeled transport vehicle which includes a frame having a first frame member and a second frame member. The second frame member is slidably movable relative to the first frame member between an extended position and a retracted position.

A tongue projecting from and connected to the second frame member is operable to move the second frame member between the extended position and the retracted position when the tongue moves relative to the first frame member.

The transport vehicle also includes wheel mounting members pivotally connected to the first frame member and wheels rotatably disposed on the wheel mounting members.

A mechanical linkage interconnects the wheel mounting members and the second frame member and is responsive to movement of the second frame member from the extended position to the retracted position to pivotally move the wheel mounting members and move the wheels upwardly relative to the first frame member to lower the frame. The mechanical linkage is further responsive to movement of the second frame member from its retracted position to its extended position to move the wheels downwardly relative to the first frame member to raise the frame.

Other features, advantages and objects of the present invention will become apparent with reference to the following description and accompanying drawings.

BRIEF DESCRIPTION OF DRAWINGS

FIG. 1 is a side, perspective view illustrating a trailer constructed in accordance with the teachings of the present invention hitched to the back of a towing motorized vehicle, only a portion of the latter being shown, the wheels of the trailer being shown in their lowermost position;

FIG. 2 is a side, elevational view of the trailer in the condition shown in FIG. 1;

FIG. 3 is a view similar to FIG. 1, but illustrating the trailer frame in lowered condition, the wheels being raised relative thereto as compared to the FIG. 1 depiction;

FIG. 4 is a side, elevational view of the trailer with the frame in the lower position as shown in FIG. 3;

FIG. 11 is a perspective view illustrating operational details of selected structure of the trailer, including stabilizer structure, a lock operatively associated with the stabilizer structure and a wheel lock;

FIG. 12 is a perspective view illustrating a tongue and drop hitch of the trailer with solid and phantom line depictions illustrating alternative positions assumed during raising and lowering the trailer; and FIG. 13 is a greatly enlarged, cross-sectional view taken along the line 13—13 in FIG. 3.

BEST MODE FOR CARRYING OUT THE INVENTION

Figure 5:
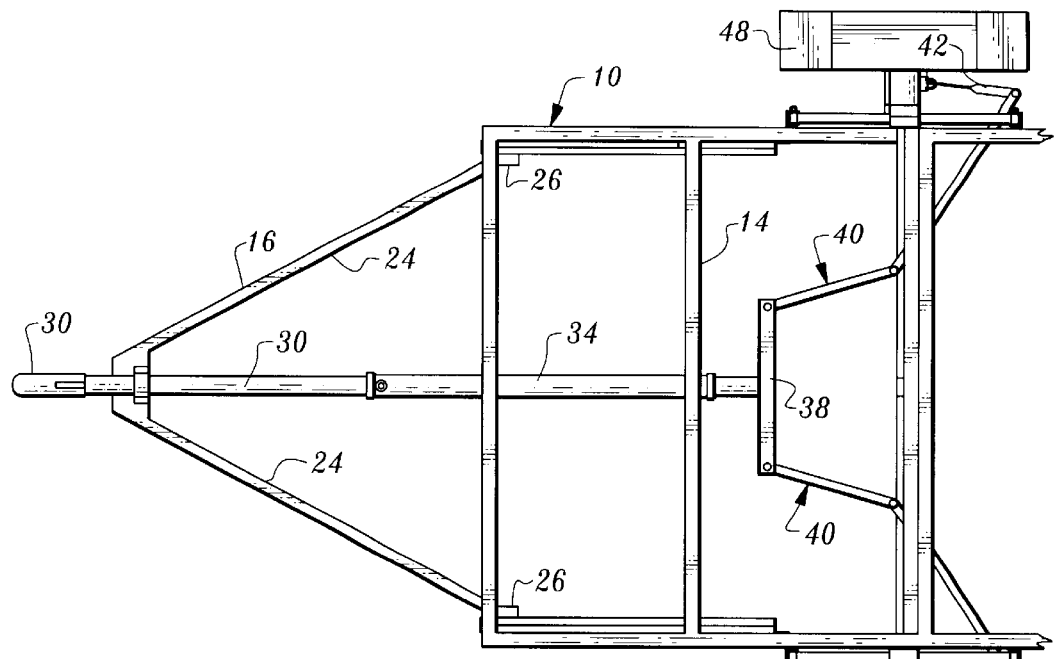
FIG. 5 is an elevational view of selected components of the trailer, including a frame member having a tongue projecting therefrom being shown in its extended position.

Referring now to the drawings, a trailer constructed in accordance with the teachings of the present invention is designated by reference numeral 10. In FIG. 1, the trailer 10 is shown attached to a motorized vehicle 12, only a portion of the latter being shown.

Figure 6:
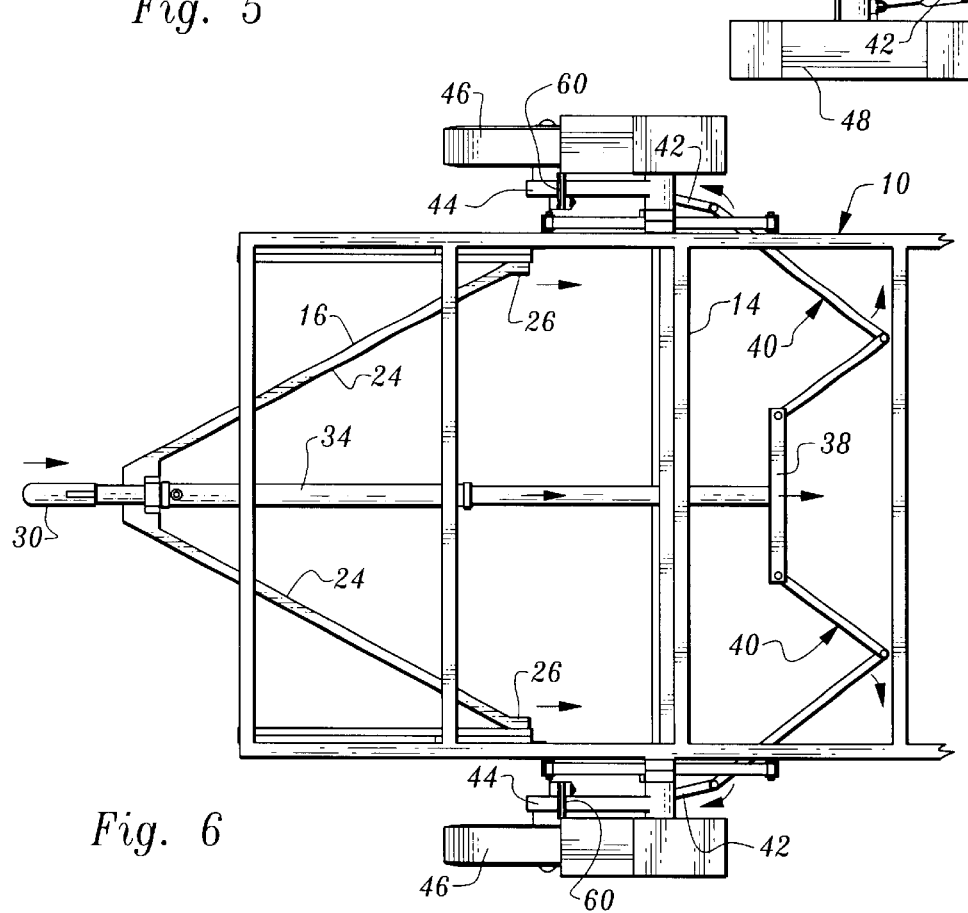
FIG. 6 is a view similar to FIG. 5, but illustrating the frame member having the tongue projecting therefrom in its retracted position.
Figure 7:
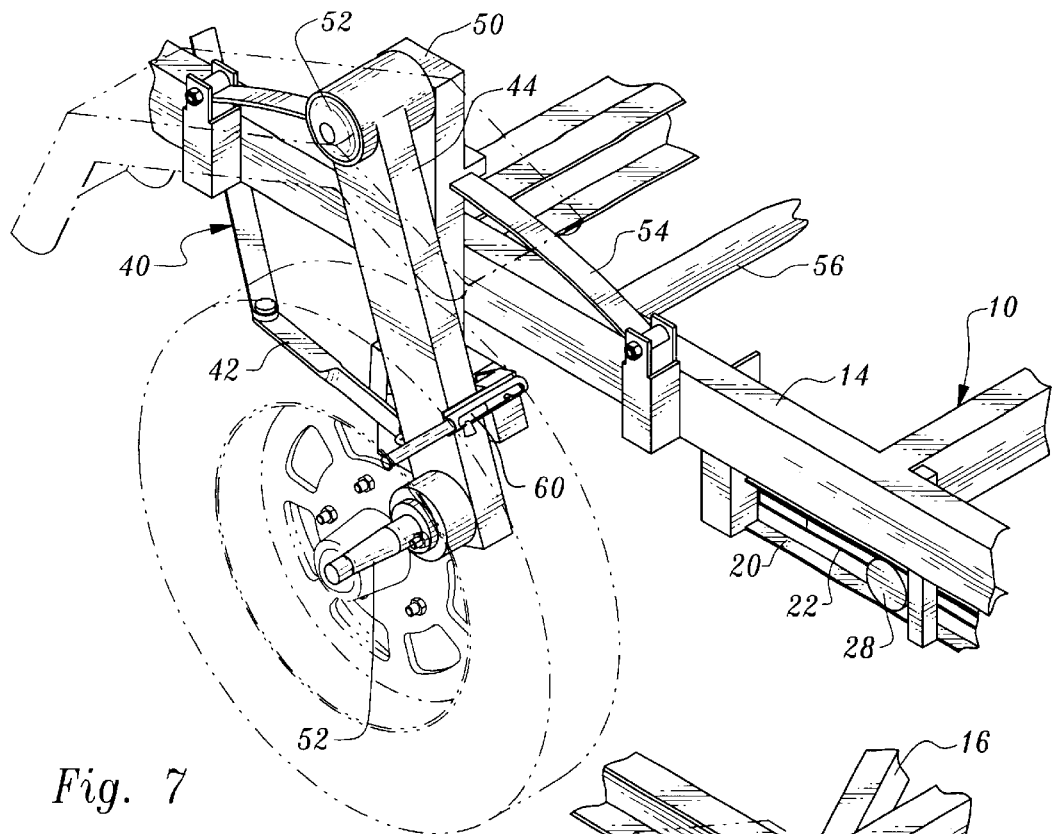
FIGS. 7 and 8 are perspective views illustrating selected portions of the frame and related structure, as viewed from different view points, when the wheels thereof are in raised condition relative to the trailer frame, the latter being lowered.
Figure 8:
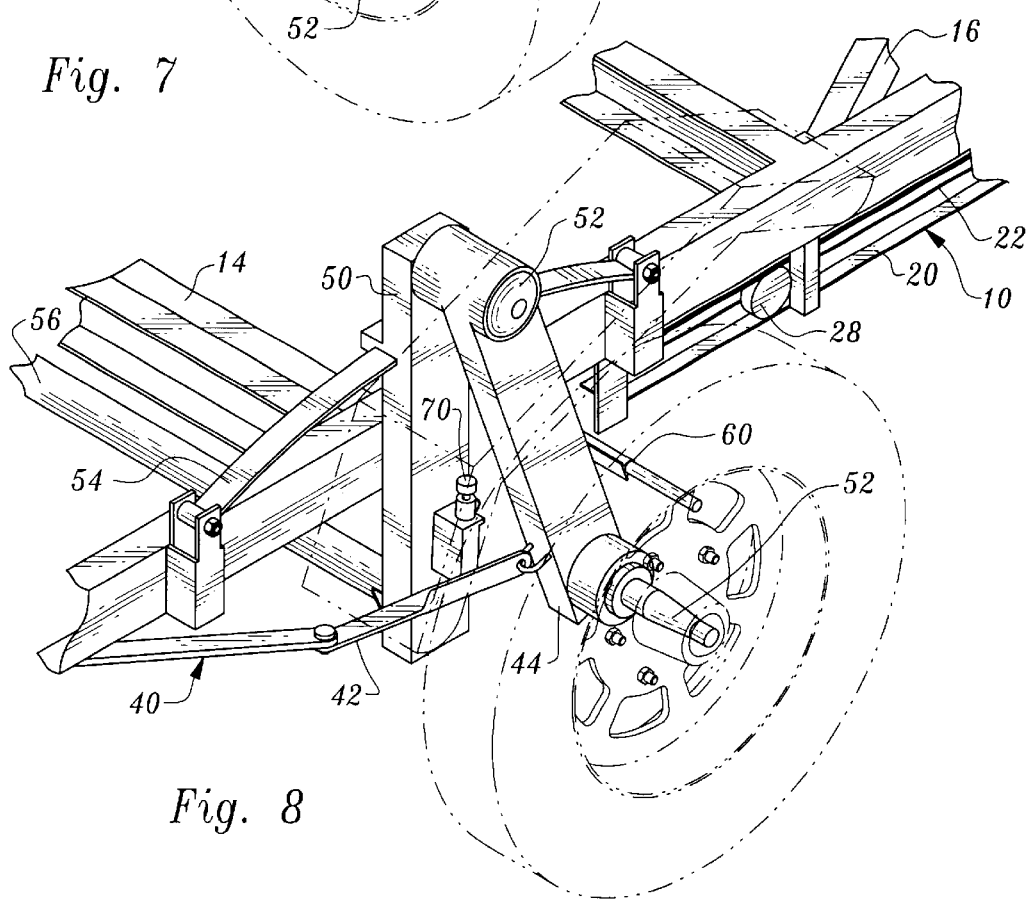
Figure 9:
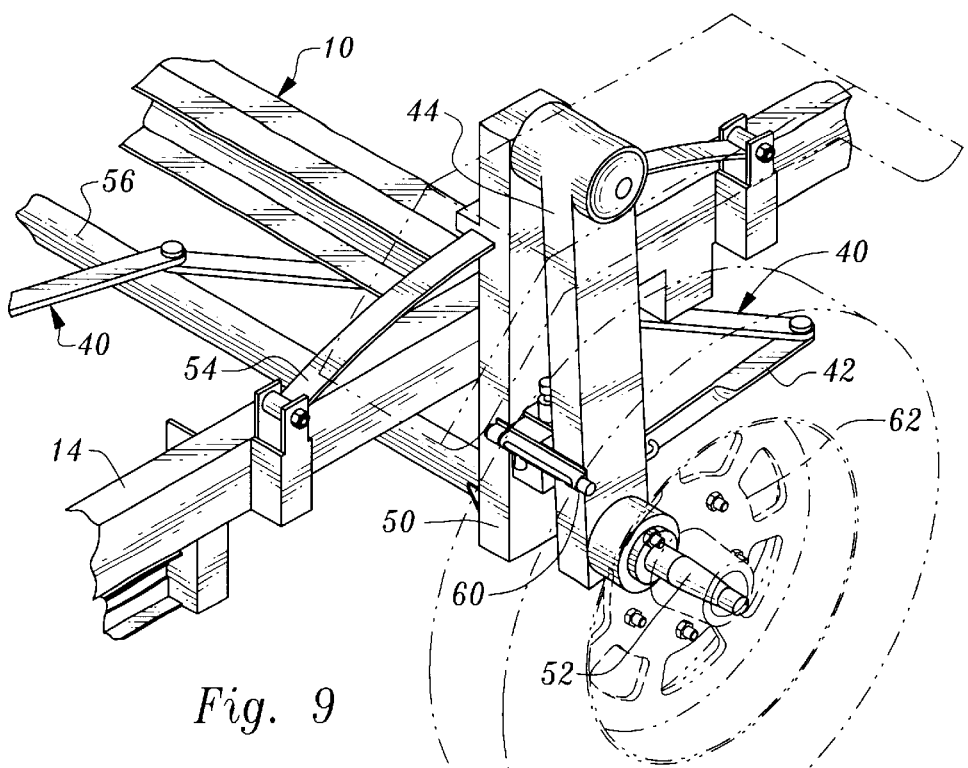
FIGS. 9 and 10 are perspective views illustrating portions of the trailer frame and associated structure, as seen from different view points, when the wheels are lowered relative to the frame, i.e. when the frame is raised.
Figure 10:
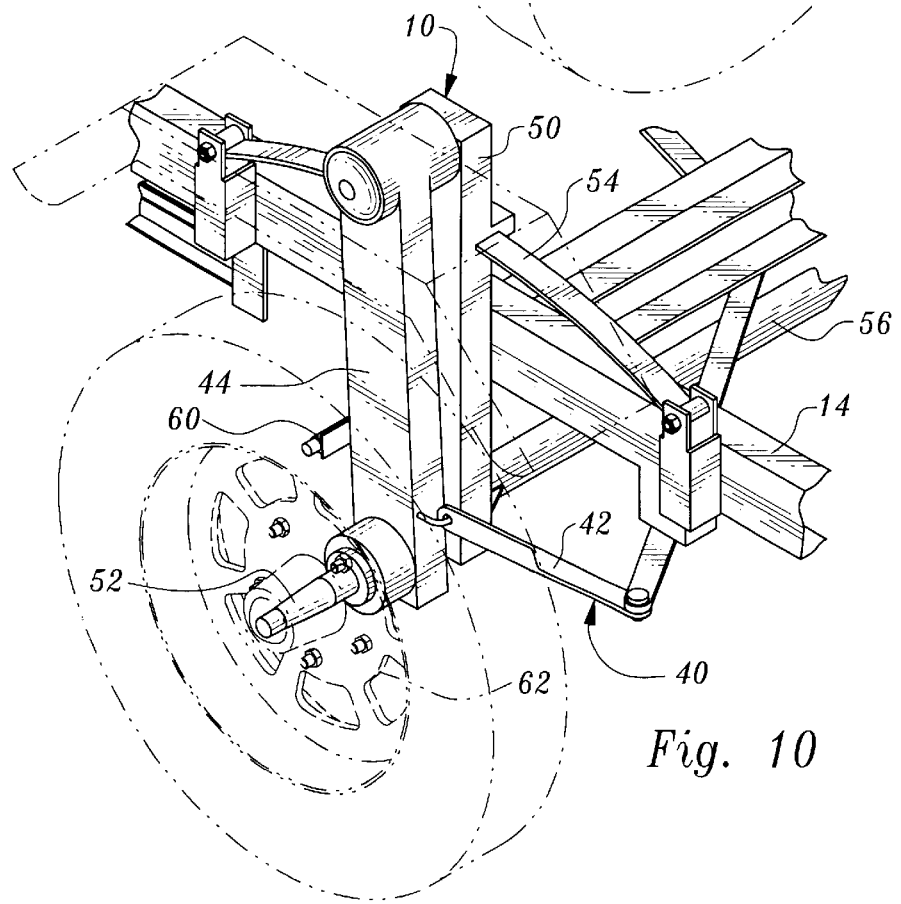

The trailer 10 incorporates a frame including a frame member 14 and a frame member 16 slidably moveable relative to frame member 14 between an extended position (shown in FIGS. 1, 2 and 5, for example) and a retracted position (shown in FIGS. 3, 4 and 6, for example). The frame member 14 supports a conventional deck or platform 18 of the trailer. In some of the drawings, for example FIGS. 5 and 6, the platform 18 is not shown so that the operation of mechanism of the trailer can be seen more clearly.

Frame member 14 includes elongated sides or rails 20 having elongated slots 22. Frame member 16 has two elongated sides 24 which are connected at outer ends thereof and diverge away from one another in a rearward direction. Located at distal ends 26 of sides 24 are connectors in the form of projections 28 which extend through elongated slots 22. Projections 28 have enlarged ends so that the projections will remain positioned in the elongated slots.

A tongue 30 projects from and is connected to frame member 16 where the sides 24 converge and are joined together at the front of the frame member. A connector bracket 32 secures the tongue to frame member 16. Tongue 30 is tubular-shaped along the length thereof and passes through a tubular guide housing 34 which is secured to frame member 14. The tongue 30 is slidably moveable within the tubular housing 34, the tubular housing guiding movement of the tongue and cooperating with projections 28 to guide movement of frame member 26 attached to the tongue. At the front or leading end thereof, the tongue 30 has a conventional trailer hitch receptacle 36 for attachment to a tow ball.

At the other end thereof, tongue 30 is connected by means of a rigid cross piece 38 to two sets of linkage 40 disposed at both ends of the cross piece. Each linkage 40 is comprised of a plurality of link arms, the outermost link arm 42 thereof being attached to a wheel mounting member 44. In the embodiment illustrated, fenders 48 are affixed to the wheel mounting members.

Frame member 14 includes two side mounts 50 disposed in a vertical orientation. The wheel mounting members 44 are rotatable about pivots 52 projecting from the upper ends of the side mounts. The wheels 46, on the other hand, are connected to the lowermost ends of the wheel mounting members 44 on stub axles or shafts 52. The side mounts 50 are connected by springs 54 to the rest of the frame member 14 so that the side mounts, the wheel mounting members and the wheels absorb shock during transport and limit impact thereof on the trailer frame. A shaft or axle 56 extends between the side mounts.

As is clearly shown in the drawings, retraction of frame member 16 from the extended position shown in FIGS. 1, 2 and 5 to the retracted position shown in FIGS. 3, 4 and 6 is accomplished by applying a force on the tongue 30 as represented by the arrows associated with the tongue in FIG. 6. Movement of the tongue activates linkage 40 and causes rotation of wheel mounting members 44 relative to side mounts 50, in turn causing the wheels 46 to move upwardly. This lowers the frame. When one wishes to return the frame to raised position (the normal, towing position), the tongue 30 is pulled outwardly to move frame member 16 to its extended position. Linkage 40 then causes the wheel mounting members 44 to rotate and move the wheels downwardly, thus causing raising of the frame.

Raising and lowering of the frame is facilitated by locking wheels 46 against rotational movement during such activity. This is accomplished by wheel locks 60 which are secured to wheel mounting members 44. In the arrangement illustrated, the wheel locks 60 are simple bolt action locks which may manually be extended to enter holes 62 in the wheels to lock the wheels against rotational movement. Of course, the wheel locks 60 are deactivated prior to towing of the trailer.

Stabilizer means is operatively associated with the frame member 14 and the wheel mounting members 46 for stabilizing the wheel mounting members relative to the frame member 14 when the frame member 16 is in its extended position. The stabilizer structure includes cradle members 64 comprising portions of frame member 14. As may perhaps best be seen with reference to FIG. 11, cradle members 64 have two intersecting planar surfaces forming a V-shaped indent. Affixed to the wheel mounting members 44 are detents 66 which have converging outer planar surfaces also forming a V-shape. The V-shaped surfaces of the cradle members 64 and detents 66 are in engagement when the frame member 16 is in its extended position, i.e. when the trailer frame is elevated and the wheels 46 are lowered. Lock bolts 70 are manually positioned in aligned openings formed in the cradle members and the detents when the structures are in engagement to lock them together. Preferably, the lock bolts are spring biased to a lock position. A bevelled cam or other suitable conventional arrangement may be associated with the lock bolt or pin to temporarily retain it in unlock position against the urging of the spring. This arrangement contributes to the stability of the wheel mounting members relative to the frame, the lock cooperable therewith to stabilize the wheel mounting members against rotational and lateral movement. When the wheels are in lowered condition, the stub axles 52 are in alignment with shaft 56. This further contributes to stability of the trailer.

A bolt-type lock 74 which may be similar in structure to that of lock bolts 70 is associated with tubular housing 34 to maintain the tongue 30 at desired locations. Referring to FIG. 13, the tongue 30 is shown in its retracted condition. An aperture 76 formed in the tongue is in alignment with the bolt of lock 74 and sliding of the bolt into the aperture will restrain the tongue against movement. Similarly, another aperture (not shown) is formed in the tongue which is in alignment with the lock 74 when the tongue is fully extended and the frame member 16 is in its extended position. Actuation of the lock 74 in such circumstances will lock the tongue and the frame member 16 in extended position wherein the trailer may be towed by a towing vehicle such as that designated by reference numeral 80 in FIG. 3.

The trailer 10 also incorporates a drop hitch 84 releasably connectable to the tongue 30 for towing the trailer. The drop hitch 84 includes drop hitch segments 86, 88 which are pivotally connected (see FIG. 12). The drop hitch segment 86 is slidable in a drop hitch housing 90 secured to the tow vehicle by a lock 92, which may be similar in structure to locks 70 and 74. When the drop hitch segments 86, 88 are aligned, the drop hitch segments can be moved to a retracted position wherein segment 86 is fully disposed within housing 90 and only a portion of drop hitch segment 88 projects therefrom. When, however, the drop hitch segments 86, 88 are in an extended condition, as shown in FIG. 12, the drop hitch segment 88 is free to pivot downwardly and lower the end thereof to which a tow ball 94 is attached. FIG. 12 shows in solid lines the positioning of the drop hitch segment 88 and the tongue 30 when the frame of the trailer 10 has been lowered. The positions of these structural elements when the trailer frame is raised are shown by phantom lines. It will be appreciated that this arrangement enables the frame to maintain a horizontal orientation at all times, whether raised or lowered.

An elongated member having two telescoping parts 91 and 93 extends rearwardly from drop hitch segment 88 to a hitch bracket 95. A coil spring 96 is connected at its ends to parts 91 and 93.

Spring 96 is under tension and initially resists outward movement of drop hitch segments 86, 88 to their extended positions; however, when the segment 88 clears housing 90, the spring will bias segment 88 downwardly as shown by the arrow in FIG. 12 to assist in the lowering thereof with tongue 30 when the trailer is lowered.

It will be appreciated that changes may be made without departing from the spirit and scope of the invention. For example, the principles of the invention can be applied to a plurality of sets of wheels, with appropriate mechanical linkage being employed to simultaneously raise or lower all wheels.

The invention claimed is:

1. A wheeled transport vehicle comprising, in combination:
    a frame including a first frame member and a second frame member, said second frame member being slidably movable relative to said first frame member between an extended position and a retracted position;
    a tongue projecting from and connected to said second frame member operable to move said second frame member between said extended position and said retracted position when said tongue moves relative to said first frame member;
    wheel mounting members pivotally connected to said first frame member;
    wheels rotatably disposed on said wheel mounting members; and
    mechanical linkage interconnecting said wheel mounting members and said second frame member responsive to movement of said second frame member from said extended position to said retracted position to pivotally move said wheel mounting members and move said wheels upwardly to lower said frame and further responsive to movement of said second frame member from said retracted position to said extended position to pivotally move said wheel mounting members and move said wheels downwardly to raise said frame.

2. The wheeled transport vehicle according to claim 1 additionally comprising stabilizer means operatively associated with said first frame member and said wheel mounting members for stabilizing said wheel mounting members relative to said first frame member when second frame member is in said extended position.

3. The wheeled transport vehicle according to claim 2 wherein said stabilizer means includes detents formed on said wheel mounting members and indents defined by said first frame member for receiving said detents.

4. The wheeled transport vehicle according to claim 3 wherein said indents are defined by cradle members having two intersecting planar surfaces forming a V-shape, said detents having outer planar surfaces forming a V-shape.

5. The wheeled transport vehicle according to claim 4 additionally comprising lock means operatively associated with said structural elements and said detents to releasably lock together said structural elements and said detents.

6. The wheeled transport vehicle according to claim 1 wherein said first frame member includes side mounts supporting said wheel mounting members movable relative to the remainder of said first frame member, said wheeled vehicle additionally comprising springs supporting said side mounts on the remainder of said first frame member.

7. The wheeled transport vehicle according to claim 1 wherein said first frame member has two spaced, elongated first frame member sides and wherein said second frame member has two elongated second frame member sides, each of said second frame member sides being slidably connected to, disposed closely adjacent to and supported by a first frame member side, and said wheeled vehicle additionally comprising connectors for maintaining said second frame member sides slidably connected to said first frame member sides.

8. The wheeled transport vehicle according to claim 7 wherein said elongated first member sides define elongated slots, said connectors comprising projections affixed to said second frame member sides and extending through said elongated slots.

9. The wheeled transport vehicle according to claim 5 wherein said lock means comprises lock pins selectively lockingly engageable with both said cradle members and said detents and positionable in openings in said cradle members and said detents which are in alignment when said second frame member is in said extended position.

10. The wheeled transport vehicle according to claim 1 additionally comprising wheel locks mounted on said frame for selective engagement with said wheels to lock said wheels against rotation when said second frame member is in said retracted position.

11. The wheeled transport vehicle according to claim 1 additionally comprising a drop hitch releasably connectable to said tongue for towing said wheeled transport vehicle behind a motorized vehicle, said drop hitch including a drop hitch housing for connection to a tow vehicle, a tongue connector for connection to said tongue, and first and second drop hitch segments, said tongue connector being located on said second drop hitch segment and said first and second drop hitch segments being telescopically movable between retracted and extended conditions relative to said drop hitch housing.

12. The wheeled transport vehicle according to claim 11 wherein said second drop hitch segment is pivotal relative to said first drop hitch segment when said first and second drop hitch segments are in an extended condition to lower or raise said tongue connector responsive respectively to lowering or raising of said frame whereby said frame will maintain a generally horizontal orientation after raising or lowering thereof.

13. The wheeled transport vehicle according to claim 12 including biasing means operatively associated with said second drop hitch segment biasing said second drop hitch segment in a downward direction.

14. The wheeled transport vehicle according to claim 1 additionally comprising a housing attached to said first frame member slidably accommodating said tongue and guiding and stabilizing said tongue.

15. The wheeled transport vehicle according to claim 1 wherein said first frame member includes side mounts supporting said wheel mounting members and wherein said wheels are rotatably mounted on stub axles projecting from said wheel mounting members, said wheeled transport vehicle additionally comprising a shaft extending between said side mounts, said stub axles being substantially aligned with said shaft when said second frame member is in said extended position.

* * * * *